US012676842B2

(12) United States Patent       (10) Patent No.:     US 12,676,842 B2
Kimura                              (45) Date of Patent:         Jul. 7, 2026

(54) COMMUNICATION SYSTEM, CONTROL METHOD THEREOF, AND STORAGE MEDIUM

(71) Applicant: CANON KABUSHIKI KAISHA, Tokyo (JP)

(72) Inventor: Tomohiro Kimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 17/705,118

(22) Filed: Mar. 25, 2022

(65) Prior Publication Data

US 2022/0321205 A1      Oct. 6, 2022

(30) Foreign Application Priority Data

Mar. 31, 2021    (JP) ................................. 2021-060817

(51) Int. Cl.
*H04B 7/185*        (2006.01)
*H04L 9/40*          (2022.01)
*H04W 12/08*       (2021.01)

(52) U.S. Cl.
CPC ............. *H04L 63/08* (2013.01); *H04W 12/08* (2013.01)

(58) Field of Classification Search
CPC .... H04L 63/08; H04W 12/08; H04W 84/042; H04W 92/02; H04W 48/02; H04W 84/12
See application file for complete search history.

(56) References Cited

U.S. PATENT DOCUMENTS

| | | | | |
|---|---|---|---|---|
| 8,316,438 B1 * | 11/2012 | Bush | ....................... | H04L 12/66 726/22 |
| 11,108,867 B2 | 8/2021 | Funahara | | |
| 2004/0255192 A1 * | 12/2004 | Watanabe | ............... | H04L 41/22 714/25 |
| 2005/0188067 A1 * | 8/2005 | Kawashima | ........ | H04L 41/0253 709/223 |
| 2006/0274674 A1 * | 12/2006 | Okita | .................. | H04L 41/0806 370/254 |
| 2008/0049779 A1 * | 2/2008 | Hopmann | ............. | H04L 41/046 370/431 |

(Continued)

FOREIGN PATENT DOCUMENTS

| | | |
|---|---|---|
| JP | 2002330155 A | 11/2002 |
| JP | 2019062495 A | 4/2019 |

(Continued)

*Primary Examiner* — Nicholas P Celani
*Assistant Examiner* — Wuji Chen
(74) *Attorney, Agent, or Firm* — Canon U.S.A., Inc. IP Division

(57)       ABSTRACT

A control method for a communication system, the communication system including a relay apparatus configured to connect to a mobile communication network, and an information processing apparatus configured to connect to the relay apparatus via a local area network, includes transmitting a request for changing an operation setting for the relay apparatus in a case where the information processing apparatus detects a connection of an external apparatus different from the relay apparatus on the local area network, and restricting communication of the external apparatus different from the relay apparatus via the mobile communication network in a case where the relay apparatus receives the request.

11 Claims, 9 Drawing Sheets

(56)         References Cited

U.S. PATENT DOCUMENTS

| | | | | |
|---|---|---|---|---|
| 2011/0122885 A1* | 5/2011 | Hedman | ................. | H04L 45/74 |
| | | | | 370/412 |
| 2011/0294502 A1* | 12/2011 | Oerton | ................... | H04W 4/60 |
| | | | | 455/426.1 |
| 2012/0163572 A1* | 6/2012 | Yanagi | ............... | H04N 1/32797 |
| | | | | 379/100.01 |
| 2012/0322433 A1* | 12/2012 | Moeller | ............... | H04W 4/021 |
| | | | | 455/418 |
| 2014/0247396 A1* | 9/2014 | Ohmae | ........... | H04N 21/43615 |
| | | | | 348/705 |
| 2015/0278771 A1* | 10/2015 | Milman | ................ | G06Q 10/20 |
| | | | | 705/26.9 |
| 2015/0382194 A1* | 12/2015 | Kang | ................... | H04W 76/30 |
| | | | | 370/338 |
| 2016/0283828 A1* | 9/2016 | Osadchyy | .......... | G06K 15/1823 |
| 2016/0291851 A1* | 10/2016 | Tomono | ................. | H04L 43/16 |
| 2016/0291904 A1* | 10/2016 | Fukushima | .......... | G06F 3/1234 |
| 2017/0046147 A1* | 2/2017 | Neville | ................ | G06F 9/4411 |
| 2017/0068492 A1* | 3/2017 | Nakamura | ........... | G06F 3/1236 |
| 2017/0238347 A1* | 8/2017 | Tong | ..................... | H04W 72/20 |
| | | | | 370/311 |
| 2017/0293454 A1* | 10/2017 | Beery | ................... | G06F 3/1206 |
| 2018/0338336 A1* | 11/2018 | Seo | ........................ | H04W 88/06 |
| 2018/0341441 A1* | 11/2018 | Kojima | ................. | G06F 1/3209 |
| 2019/0098093 A1 | 3/2019 | Funahara | | |
| 2019/0116497 A1* | 4/2019 | Veramendi | ............ | G06F 9/4411 |
| 2019/0191018 A1* | 6/2019 | Sasadai | ............... | H04L 12/4625 |
| 2020/0244557 A1* | 7/2020 | Nie | ..................... | H04L 43/0823 |
| 2020/0401360 A1* | 12/2020 | You | ..................... | G06F 13/4282 |
| 2022/0321205 A1* | 10/2022 | Kimura | ................. | H04W 48/02 |
| 2023/0266953 A1* | 8/2023 | Yamaguchi | ........... | G06F 3/1236 |
| | | | | 717/176 |
| 2023/0362711 A1* | 11/2023 | Bang | .................... | H04W 12/50 |
| 2023/0370871 A1* | 11/2023 | Chen | .................... | H04W 24/04 |

FOREIGN PATENT DOCUMENTS

| | | | |
|---|---|---|---|
| JP | 2019083446 A | 5/2019 |
| JP | 2019102862 A | 6/2019 |
| WO | 2020050057 A1 | 3/2020 |

* cited by examiner

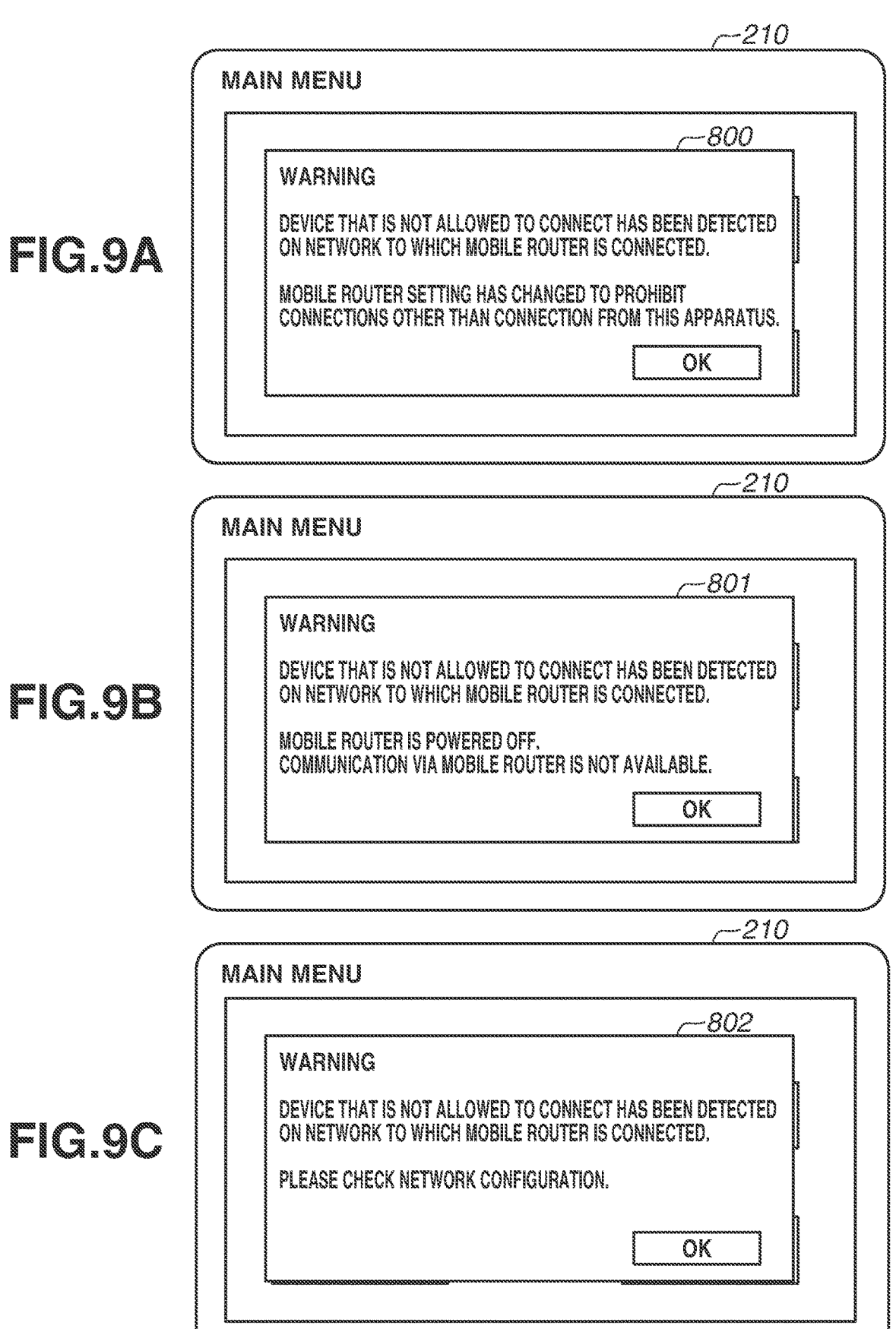

MAIN MENU

*800*

WARNING

DEVICE THAT IS NOT ALLOWED TO CONNECT HAS BEEN DETECTED
ON NETWORK TO WHICH MOBILE ROUTER IS CONNECTED.

MOBILE ROUTER SETTING HAS CHANGED TO PROHIBIT
CONNECTIONS OTHER THAN CONNECTION FROM THIS APPARATUS.

MAIN MENU

*801*

WARNING

DEVICE THAT IS NOT ALLOWED TO CONNECT HAS BEEN DETECTED
ON NETWORK TO WHICH MOBILE ROUTER IS CONNECTED.

MOBILE ROUTER IS POWERED OFF.
COMMUNICATION VIA MOBILE ROUTER IS NOT AVAILABLE.

MAIN MENU

*802*

WARNING

DEVICE THAT IS NOT ALLOWED TO CONNECT HAS BEEN DETECTED
ON NETWORK TO WHICH MOBILE ROUTER IS CONNECTED.

PLEASE CHECK NETWORK CONFIGURATION.

OK

COMMUNICATION SYSTEM, CONTROL METHOD THEREOF, AND STORAGE MEDIUM

BACKGROUND

Field of the Disclosure

The present disclosure relates to a communication system for communicating data with an external apparatus, a control method thereof, and a storage medium.

Description of the Related Art

A configuration in which an information communication apparatus is connected to a relay apparatus as typified by a mobile router and a mobile phone line is used when the information processing apparatus is connected to an external network is known. Japanese Patent Application Laid-Open No. 2019-62495 discusses a technique in which information communication apparatuses on different networks establish an end-to-end communication via a relay apparatus and a mobile phone communication network (also referred to as a mobile communication network).

An information processing apparatus such as an image forming apparatus includes a service that enables remote apparatus management by transmitting apparatus information to an apparatus management server on the Internet. Examples of the apparatus information to be transmitted to the apparatus management server from an image forming apparatus include counter information (the number of sheets used in the image forming apparatus), the amount of used consumables, the remaining amount of consumables, and log information about the image processing apparatus.

SUMMARY

According to an aspect of the present disclosure, a communication system includes a relay apparatus configured to connect to a mobile communication network, and an information processing apparatus configured to connect to the relay apparatus via a local area network, wherein the information processing apparatus includes a transmission unit configured to transmit a request for changing an operation setting for the relay apparatus upon detection of a connection of an external apparatus different from the relay apparatus on the local area network, and wherein the relay apparatus includes a restriction unit configured to restrict communication of the external apparatus different from the relay apparatus via the mobile communication network upon reception of the request.

Further features of various embodiments will become apparent from the following description of exemplary embodiments with reference to the attached drawings.

BRIEF DESCRIPTION OF THE DRAWINGS

FIGS. 9A, 9B, and 9C each illustrate an example of a screen to be displayed on an operation unit of the MFP.

DESCRIPTION OF THE EMBODIMENTS

Figure 1:
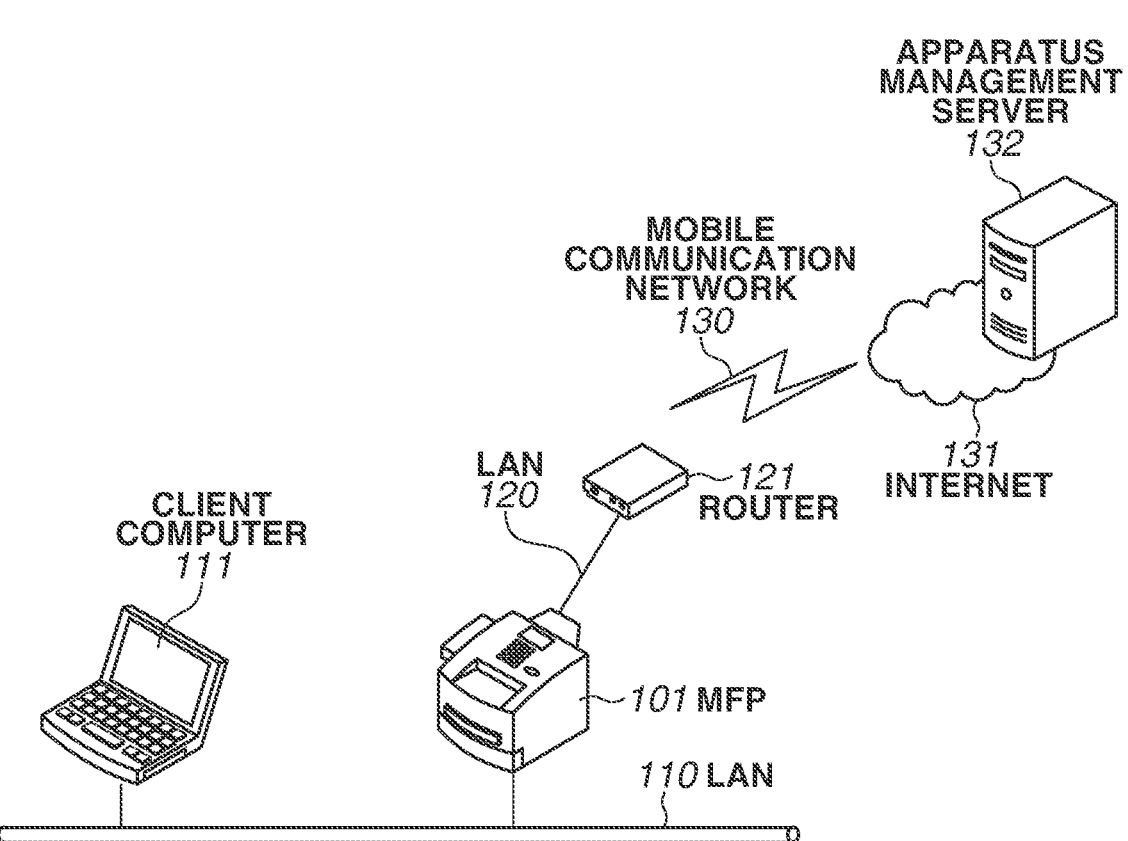
FIG. 1 is a schematic diagram illustrating a configuration example of a communication system according to a first exemplary embodiment.

Exemplary embodiments for carrying out the present disclosure will be described below with reference to the drawings. The following exemplary embodiments are not meant to limit the scope of every embodiment, and not all combinations of features described in the exemplary embodiments are essential to the solution of the disclosure.

First, the premise will be described. A relay apparatus, such as a mobile router, can be used to transmit apparatus information to an apparatus management server. In this case, a communication system in which the relay apparatus is connected to an information processing apparatus to establish communication with the apparatus management server via the relay apparatus and a mobile communication network is constructed.

In this case, an organization, such as a vendor or sales company of an image forming apparatus, which is different from an end user that actually uses the image forming apparatus, can enter into a service contract with a carrier of a mobile communication network and construct a communication system so as to provide apparatus management services as described above.

In this case, it is assumed that the vendor or sales company makes a contract for a mobile communication network data plan that provides a sufficient amount of data packets to be used at a low communication cost in view of both the maintenance cost of apparatus management services and the amount of data packets for transmitting and receiving apparatus information.

A typical relay apparatus, such as a mobile router, is configured to connect network devices that comply with Institute of Electrical and Electronics Engineers (IEEE) 802.3 series standards and network devices that comply with IEEE 802.11 standards and the like. If an unintended network device is connected to the relay apparatus by a third party or the like after the communication system is constructed, data communication unintended by the vendor or sales company that bears the cost of the communication system can be performed.

In view of the above-described issues, according to an exemplary embodiment of the present disclosure, it is possible to provide a communication system that performs control processing to prevent an unintended network device from using a mobile communication network of a router upon detection of a connection of another information processing apparatus that is different from the router.

The above-described control processing makes it possible to reduce the possibility that data communication via a relay apparatus and a mobile communication network is unintentionally performed for an unintended purpose and the amount of data communication exceeds an assumed amount of data communication, so that restrictions, such as a restriction on communication speed of a mobile phone line, or interruption of communication, take place, which may adversely affect the service operation. Also, in terms of security, the above-described control processing makes it possible to prevent data communication unintended by a contractor of a mobile communication network from being performed by a third party or the like.

Exemplary embodiments for carrying out the present disclosure will be described in detail below with reference to the drawings. The following exemplary embodiments are not meant to limit the scope of claims, and not all combinations of features described in the exemplary embodiments are essential to every embodiment.

A configuration example of a communication system according to the first exemplary embodiment will now be described with reference to FIG. 1. The communication system according to the present exemplary embodiment includes at least a multi-function peripheral (MFP) 101 and a router 121. The MFP 101 is connected to the router 121 via a local area network (LAN) 120. The present exemplary embodiment assumes a case where the MFP 101 and the router 121 are directly connected to each other via an Ethernet® crossover cable and the LAN 102 is constructed by connecting the MFP 101 and the router 121. However, the present exemplary embodiment is not limited to this case. The router 121 provides an information processing apparatus connected to the LAN 120 with an Internet access. The MFP 101 accesses a server and resources on the Internet 131 via the router 121 and a mobile communication network 130. In this manner, the router 121 functions as a relay apparatus that provides the information processing apparatus connected to the LAN 120 with the Internet access via the mobile communication network 130, such as Code-Division Multiple Access (CDMA), Long Time Evolution (LTE), or the fifth-generation mobile communication system (5G).

The MFP 101 includes a scan function for transmitting data based on images obtained by scanning data with a scanner to an external apparatus. The MFP 101 also includes a print function and a copy function for printing an image on a sheet, such as paper, based on a print job received from the external apparatus. The present exemplary embodiment illustrates an example where the MFP 101 including a plurality of functions is used as an example of the information processing apparatus that constitutes the communication system. However, the present exemplary embodiment is not limited to this example. An apparatus including a single function, such as a scanner or a printer, may also be used. Any other apparatus such as a three-dimensional (3D) printer and a 3D scanner may also be used. The present exemplary embodiment can also be applied to a communication system including a relay apparatus and an apparatus, such as a vending machine for selling bottles of drinking water, a monitoring camera, or a digital signage device.

The MFP 101 also includes an apparatus management function for transmitting apparatus information to an apparatus management server 132 on the Internet 131. The MFP 101 according to the present exemplary embodiment transmits apparatus information to the apparatus management server 132 via the LAN 120 and the router 121.

The MFP 101 is also connected to a LAN 110 and is configured to communicate with a client computer on the LAN 110 or a client computer that is accessible to the LAN 110. For example, the MFP 101 can receive a print job from a client computer 111 and can perform printing based on the print job.

<Hardware Configuration of MFP 101>

Figure 2:
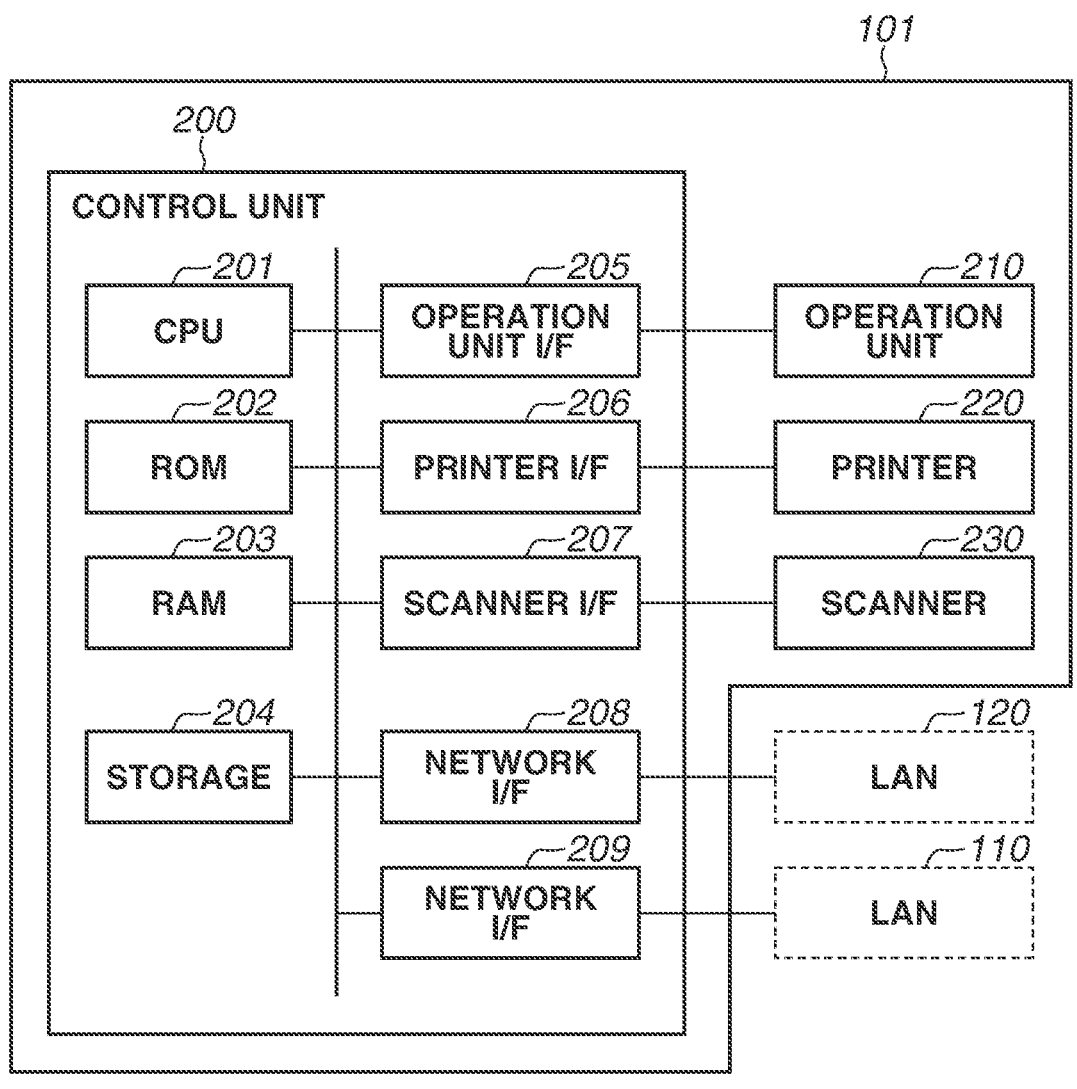
FIG. 2 is a block diagram illustrating a hardware configuration example of a multi-function peripheral (MFP).

Next, a hardware configuration example of the MFP 101, which is an example of the information processing apparatus according to the present exemplary embodiment, will be described with reference to FIG. 2. FIG. 2 is a block diagram illustrating a hardware configuration example of the MFP 101.

A control unit 200 including a central processing unit (CPU) 201 controls the overall operation of the MFP 101. The CPU 201 reads out control programs stored in a read-only memory (ROM) 202 or a storage 204, and executes various control operations such as a printing control operation and a reading control operation. The ROM 202 stores control programs that can be executed by the CPU 201. A random access memory (RAM) 203 is a main storage memory accessed by the CPU 201, and is used as a work area or a temporary storage area in which various control programs are loaded. The storage 204 is a nonvolatile storage area in which print jobs, image data, various programs, and various setting information are stored. The storage 204 is a hardware module, such as a hard disk drive (HDD) or a solid-state drive (SSD). Thus, the hardware modules, such as the CPU 201, the ROM 202, the RAM 203, and the storage 204, constitute a computer. The storage 204 also stores programs for transmitting connection information for communication with the router 121 and requests for the router 121.

Assume that, in the MFP 101 according to the present exemplary embodiment, each process illustrated in flowcharts to be described below is executed by a single CPU 201 using a single memory (RAM 203). However, any other configuration may be used. For example, each process to be described below can also be executed by a plurality of processors, memories and storages in cooperation. Some of the processes may be executed using hardware circuits.

A printer interface (I/F) 206 connects a printer 220 (printer engine) and the control unit 200 to each other. The MFP 101 generates a print image and a print control command that are transferred to the printer 220 based on a print job received from the client computer 111 via the LAN 110 or the like. The printer 220 prints an image on a sheet fed from a sheet feed cassette (not illustrated) based on the print image and the print control command input via the printer I/F 206. An electrophotographic method in which toner is transferred and fixed onto paper, or an inkjet method in which ink droplets are discharged onto paper to print images on the paper, may be used as a printing method.

A scanner I/F 207 connects a scanner 230 and the control unit 200 to each other. The scanner 230 scans a document placed on a platen glass (not illustrated) and generates image data. The image data generated by the scanner 230 is printed by the printer 220, is stored in the storage 204, or is transmitted to the client computer 111 via a network interface.

An operation unit I/F 205 connects an operation unit 210 and the control unit 200 to each other. The operation unit 210 includes a liquid crystal display unit including a touch panel function and various hardware keys. The operation unit 210 functions as a display unit that displays information for a user, or a reception unit that receives an instruction from the user. The CPU 201 performs an information display control and a user operation reception control in cooperation with the operation unit 210.

A network I/F 208 is an interface for connection to the LAN 120. The present exemplary embodiment illustrates a case where the MFP 101 is connected to the LAN 120 via the network I/F 208.

One end of a network cable is connected to the network I/F 208. The other end of the network cable is connected to the router 121. The LAN 120 is constructed by connecting the MFP 101 and the router 121. The MFP 101 can execute communication with the router 121 on the LAN 120 via the network I/F 208. Further, the MFP 101 can execute communication with the server on the Internet 131 via the router 121. The present exemplary embodiment assumes a case where a network I/F 209 is a communication interface for connecting a wired cable of a connector format, such as an RJ45 connector or GigaGate (GG) 45 connector, and establishing communication based on Ethernet®. However, the present exemplary embodiment is not limited to this case. For example, a wireless communication method that complies with IEEE 802.11 series may be used as a communication method for a physical layer that transmits data to the router 121.

The network cable is connected to the network IN 209. The MFP 101 transmits image data and information to the client computer 111 on the LAN 110 via the network I/F 209, and receives data, such as a print job, from the client computer 111 on the LAN 110. It is also assumed that the network I/F 209 is used to establish a wired communication based on Ethernet®. However, the present exemplary embodiment is not limited to this example. A wireless communication method may also be used as a communication method for the physical layer.

The present exemplary embodiment illustrates a case where the two network I/Fs 208 and 209 are included in the MFP 101. However, the present exemplary embodiment is not limited to this case. The MFP 101 may include at least a network IN for communicating with the router 121. Alternatively, the MFP 101 may include three or more network I/Fs.

<Hardware Configuration of Router 121>

Figure 3:
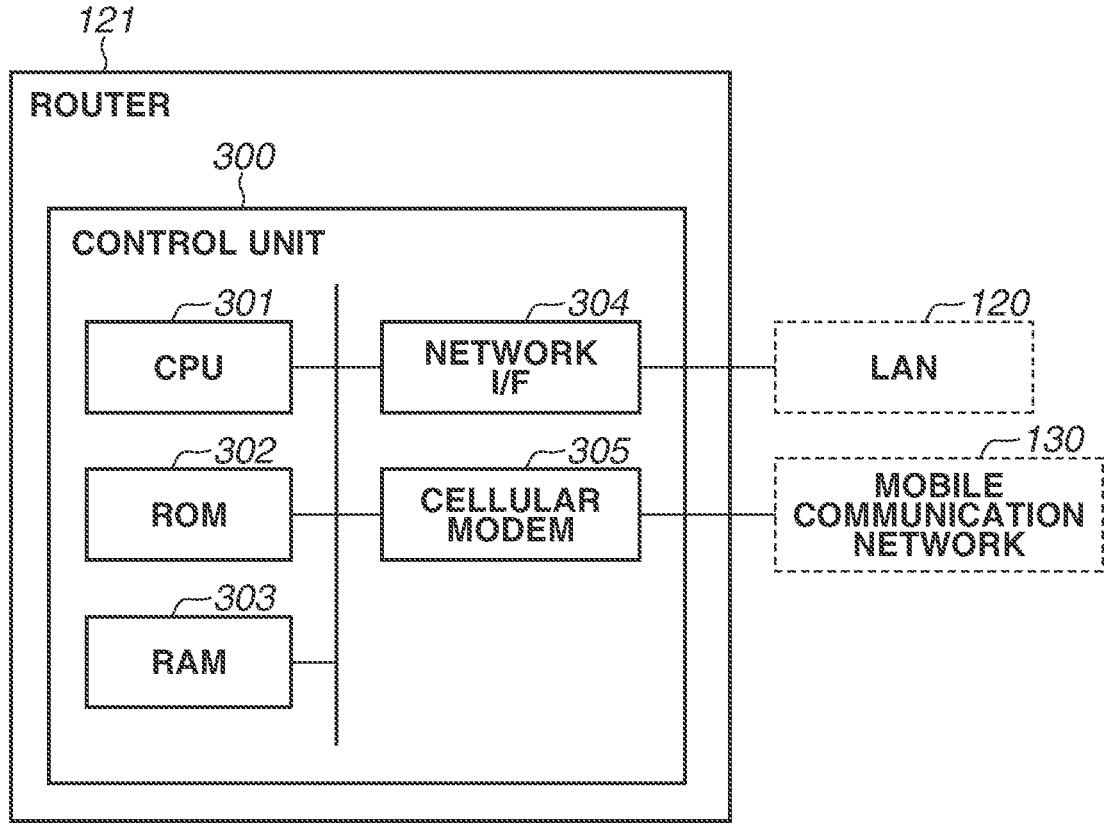
FIG. 3 is a block diagram illustrating a hardware configuration example of a router.

Next, a hardware configuration example of the router 121, which is an example of the relay apparatus according to the present exemplary embodiment, will be described with reference to FIG. 3. FIG. 3 is a block diagram illustrating a hardware configuration example of the router 121.

A control unit 300 including a CPU 301 controls the overall operation of the router 121. The CPU 301 reads out control programs stored in a ROM 302 and executes various control processes.

A RAM 303 is used as a temporary storage area, such as a main memory or a work area for the CPU 301.

One end of the network cable is connected to a network I/F 304. As described above, the other end of the network cable is connected to the MFP 101, and thus the LAN 120 is constructed by connecting the MFP 101 and the router 121. The network I/F 304 is an interface to be connected to an information processing apparatus for which Internet access is provided. The present exemplary embodiment assumes a case where the network I/F 304 is a communication interface for connecting a wired cable of a connector format, such as an RJ45 connector or GigaGate (GG) 45 connector, and establishing communication based on Ethernet®. However, the present exemplary embodiment is not limited to this case. A wireless communication method may be used as a communication method for the physical layer. In the case of using the wireless communication method, a wireless connection may be established using a common network parameter between the MFP 101 and the router 121 by a set-up method such as Wi-Fi® Protected Setup (WPS). When the wireless connection is established, the router 121 functions as a dynamic host configuration protocol (DHCP) server and allocates an internet protocol (IP) address to the MFP 101. After the allocation is completed, the LAN 120 on which the router 121 and the MFP 101 participate is formed, thereby enabling the MFP 101 to access the Internet 131 via the LAN 120. Instead of using the DHCP server, an IP address may be manually allocated as an operation setting for the router 121 and the MFP 101.

A cellular modem 305 is a modem used for data communication with a base station of the mobile communication network 130. The CPU 301 controls communication via the mobile communication network 130 in cooperation with the cellular modem 305. This configuration will be described in detail below. A subscriber identity module (SIM) card (not illustrated) is attached to the router 121. The SIM card is a card that is offered from a carrier that provides mobile communication services using a mobile communication network, and stores an identification (ID) number (also referred to as subscriber identification information) for identifying a subscriber. The CPU 301 identifies a mobile communication network to be connected and performs processing for connecting to the mobile communication network based on information stored in the SIM card in cooperation with the modem 305. After the connection is established, the router 121 shifts to a normal operation state where the Internet access can be provided to the apparatus connected to the LAN 120 via the mobile communication network 130. Subscriber identification information used for establishing the connection may be stored in an embedded-SIM (eSIM) incorporated in the router 121.

The communication system illustrated in FIG. 1 is constructed by, for example, a sales company or a vendor of the MFP 101 so that the router 121 is used to transmit apparatus information about the MFP 101. A service engineer, an installation vendor, or the like of the MFP 101 may construct the communication system. In this case, the sales company or vendor of the MFP 101 can enter into a service contract with a carrier of a mobile communication service using a communication network and can construct a communication system in many cases. It is assumed that the vendor or sales company makes a contract for a mobile communication network data plan that provides a sufficient amount of data packets to be used at a low communication cost in view of both the maintenance cost of apparatus management services and the amount of data packets for transmitting and receiving apparatus information. On the other hand, the router 121 can connect network devices that comply with IEEE 802.3 series standards and network devices that comply with IEEE 802.11 standards and the like. Accordingly, if an unintended network device is connected to the relay apparatus by a third party or the like after the communication system is constructed, data communication unintended by the vendor or sales company that bears the cost of the communication system can be performed.

Figure 6:
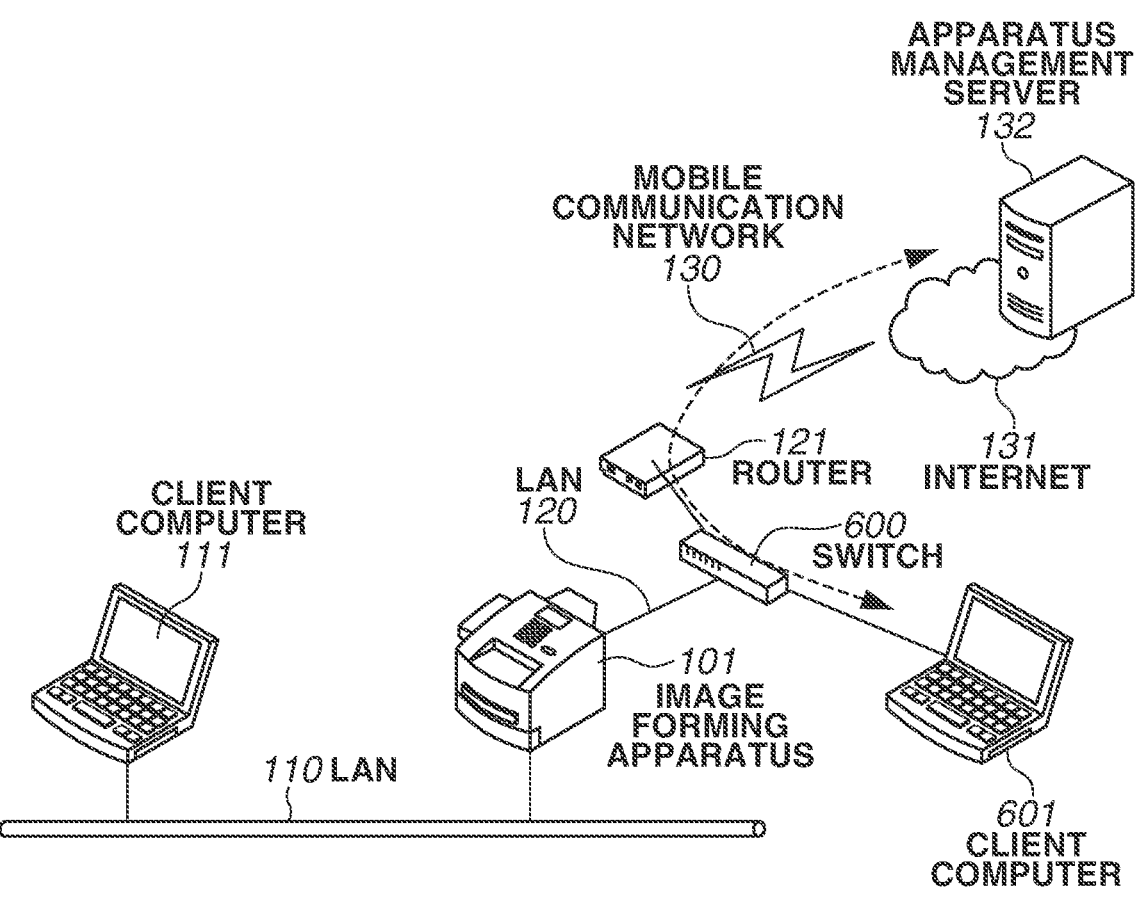
FIG. 6 is a schematic diagram illustrating an example of an unintended connection between network devices.

This configuration will be described in detail with reference to FIG. 6. FIG. 6 is a schematic diagram illustrating an example of the communication system to which a new network device is connected by a third party.

FIG. 6 differs from FIG. 1 in that a switch 600 and a client computer 601 are newly connected to the LAN 120. The switch 600 is a switching hub having a network distribution function. FIG. 6 illustrates a case where the switch 600 is disposed between the MFP 101 and the router 121. FIG. 6 also illustrates a case where the client computer 601 is connected to the LAN 120 via the switch 600.

The client computer 601 is an example of a network device that is newly connected and is unintended when the communication system is constructed. The client computer 601 connected to the LAN 120 via the switch 600 is accessible to the Internet 131 via a path indicated by a broken line. If a wireless communication method is used for the physical layer of the LAN 120, the client computer 601 is connected to the LAN 120 by a mechanism such as the above-described WPS.

If the connection illustrated in FIG. 6 is established, data may be exchanged via the relay apparatus and the mobile communication network 130 for an unintended purpose. In this case, the amount of data packets may exceed an assumed amount of data packets to be used by the sales company or vendor of the MFP 101 and may also exceed an upper limit of the amount of data packets prescribed in the data plan for which the contract is made with a mobile communication service provider. In this case, restrictions, such as a restriction on communication speed of a mobile phone line, or interruption of communication, take place, which may adversely affect the service operation. Also, in terms of security, it may be desirable to prevent data communication unintended by a contractor of a mobile communication network from being performed by a third party or the like.

In view of the above-described issues, according to the present exemplary embodiment, it is possible to provide a mechanism for preventing an unintended network device from using a mobile communication network in a communication system connected to the mobile communication network. This mechanism will be described in detail below.

Figures 4A, 4B:
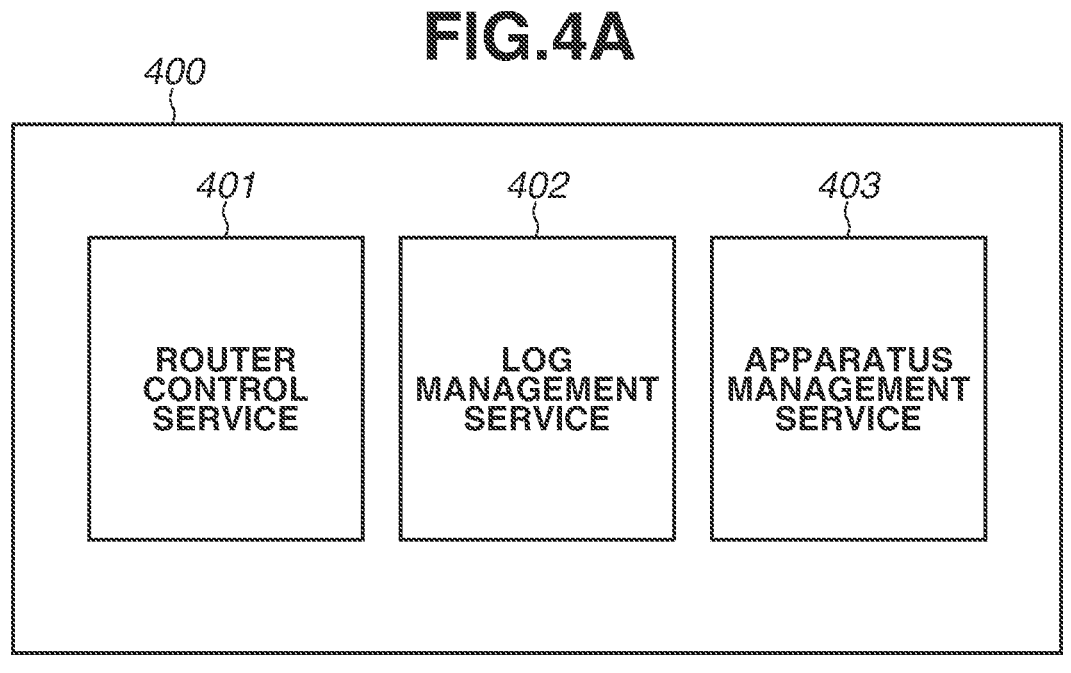
FIGS. 4A and 4B are block diagrams each illustrating a software configuration example of the MFP.

FIGS. 4A and 4B are block diagrams each illustrating a software configuration example of the MFP 101. FIG. 4A illustrates an overall configuration of software modules, and FIG. 4B illustrates a detailed configuration of a router control service 401. The software modules illustrated in FIGS. 4A and 4B are implemented such that the CPU 201 executes programs corresponding to the modules stored in the storage 204 or the like.

A control module 400 is a software module that controls the overall operation of the MFP 101 including functions such as a printer and a scanner. The control module 400 includes the router control service 401, a log management service 402, and an apparatus management service 403. For convenience of illustration, FIG. 4A illustrates only control modules that are closely related to communication with the router 121, and the illustration of control modules for print processing, scan processing, copy processing, and the like is omitted.

The router control service 401 is a module for providing services for detecting a state where an unintended use may occur and sending a request to the router 121. The router control service 401 detects a communication apparatus that may be used for an intended purpose, attempts to change settings for the mobile router, and issues a notification, such as a warning, to the user of the MFP 101.

The log management service 402 is a service for managing corresponding log information indicating the operation of the MFP 101, setting change, or the like. If the state where an unintended use may occur is detected, the router control service 401 sends a log recording request to the log management service 402. The log management service 402 that has received the request stores the detection log. The log management service 402 stores the corresponding log, for example, when a security error has occurred in the MFP 101, or when a data access to the MFP 101 has occurred. The log management service 402 transmits the stored log to a service for providing Security Information and Event Management (SIEM). The service for providing the SIEM may be a cloud service loaded on a cloud server, or may be an on-premise service installed on a network in a company in which the MFP 101 is installed.

The apparatus management service 403 is a service for transmitting the apparatus information about the MFP 101 to the apparatus management server 132. The apparatus management service 403 transmits the apparatus information, such as a part of the log stored in the log management service 402, or counter information indicating the number of printed sheets in the MFP 101, to the apparatus management server 132. The apparatus management service 403 also transmits status information about consumables as typified by coloring materials, such as toner and ink used by the MFP 101, as the apparatus information, to the server 132. The information to be transmitted to the server 132 is information for providing customers with services, such as maintenance of the MFP 101, delivery of consumables, and calculation of a charge for use. The apparatus management service 403 transmits the apparatus information periodically (e.g., every 12 hours). Assume that, in the present exemplary embodiment, for convenience of explanation, operation settings are made such that the apparatus management service 403 transmits the apparatus information via the router 121 through the LAN 120.

On the other hand, the operation setting for log transmission is made such that the log corresponding to the service for providing the SIEM by the log management service 402 is transmitted via the LAN 110.

FIG. 4B is a block diagram illustrating a functional configuration example of the router control service 401. A communication monitoring unit 410 includes a router association unit 420 and a user interface (UI) control unit 430. The communication monitoring unit 410 monitors communication on the LAN 120, and verifies whether the MFP 101 and an apparatus that is different from the router 121 are on the LAN 120, thereby detecting the presence of a communication apparatus that can be used for an unintended purpose other than an internet access provided by the router 121.

The router association unit 420 includes a router information management unit 421 and a router setting processing unit 422.

The router information management unit 421 stores information about the router 121, such as a media access control (MAC) address and IP address of the router 121, and the IP address or the like used by the MFP 101 to communicate with the router 121. The information is set based on an operation performed by a service engineer, an installation worker, or the like when the service engineer, the installation worker, or the like constructs the communication system illustrated in FIG. 1. The router information management unit 421 also stores authentication information for changing settings for the router 121, router capability information, and the like. The method for setting the information about the router 121 is not limited to this method. The router association unit 420 can also be configured to acquire setting information from the router 121 using a Simple Network Management Protocol (SNMP) and store the acquired setting information in the router information management unit 421. In this case, the router association unit 420 sends an inquiry to a Management Information Base (MIB) agent provided by the router 121 using, for example, a GetRequest operation in which an object identifier indicating desired information is designated. The router 121 sends back apparatus information identified based on the object identifier included in the inquiry. Thus, a part or all of the information can be dynamically acquired from the router 121.

For example, the router setting processing unit 422 requests the router 121 to change settings, or requests the router 121 to shut down. The router setting processing unit

422 uses a SetRequest operation via the SNMP to send a request to the router 121 to change settings or change the operation state. The method for sending a request to the router 121 is not limited to this example. When the router 121 provides a web application programming interface (API), a request for changing settings or changing the operation state may be sent via the web API. Further, the MFP 101 may be remotely connected to the router 121 via a protocol, such as Secure Shell (SSH), to remotely operate the router 121.

Figure 5:
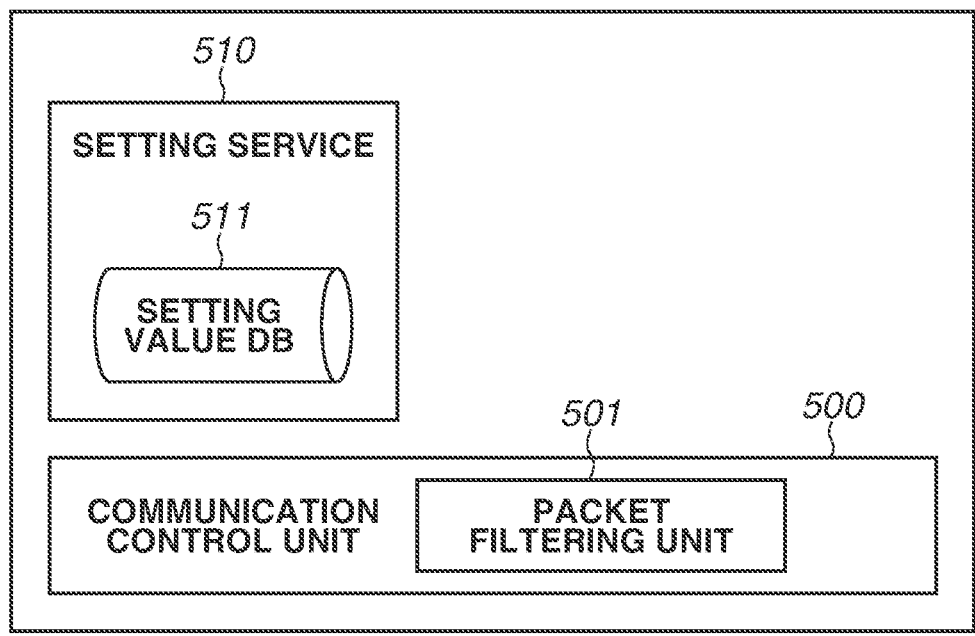
FIG. 5 is a block diagram illustrating a software configuration example of the router.

Next, a software configuration example of the router 121 will be described with reference to FIG. 5. FIG. 5 illustrates a software configuration example of the router 121. Each module illustrated in FIG. 5 is implemented such that the CPU 201 executes programs corresponding to the modules stored in the storage 204 or the like.

A communication control unit 500 controls data communication via the LAN 120 and the mobile communication network 130 in cooperation with the network I/F 304 and the cellular modem 305. FIG. 5 illustrates a case where the communication control unit 500 includes a packet filtering unit 501 used for the router 121 to perform packet filtering. The packet filtering unit 501 provides a function typically called a firewall. Specifically, the packet filtering unit 501 provides a packet filtering function for allowing or cancelling packet communication according to designated rules. A setting service 510 is a module for storing settings for the router 121 in a setting value database (DB) 511, receiving a setting change request and a shut-down request from the MFP 101, making settings for the router 121, and updating or changing the operation mode. As a method for receiving such requests, the requests may be received by the SNMP as described above, or may be received by providing the web API. Alternatively, the requests may be directly received from the MFP 101 using a remote connection by SSH. The setting service 510 changes the operation setting for the packet filtering unit 501, shuts down the router 121, or shifts the operation state to a power-off state where the router 121 does not provide the relay function, based on the requests received from the MFP 101.

Figure 7:
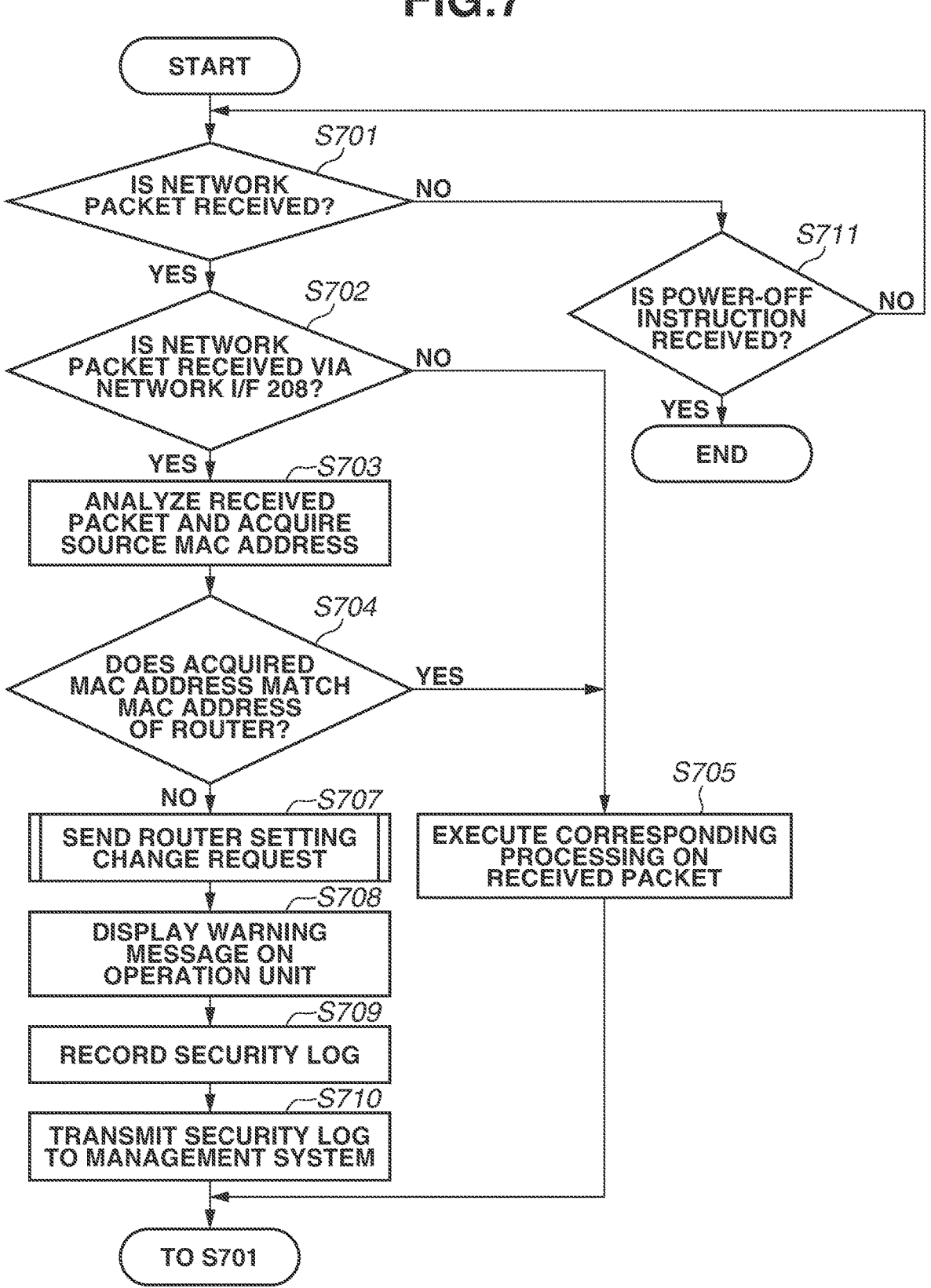
FIG. 7 is a flowchart illustrating an example of control processing to be executed by the MFP.
Figure 8:
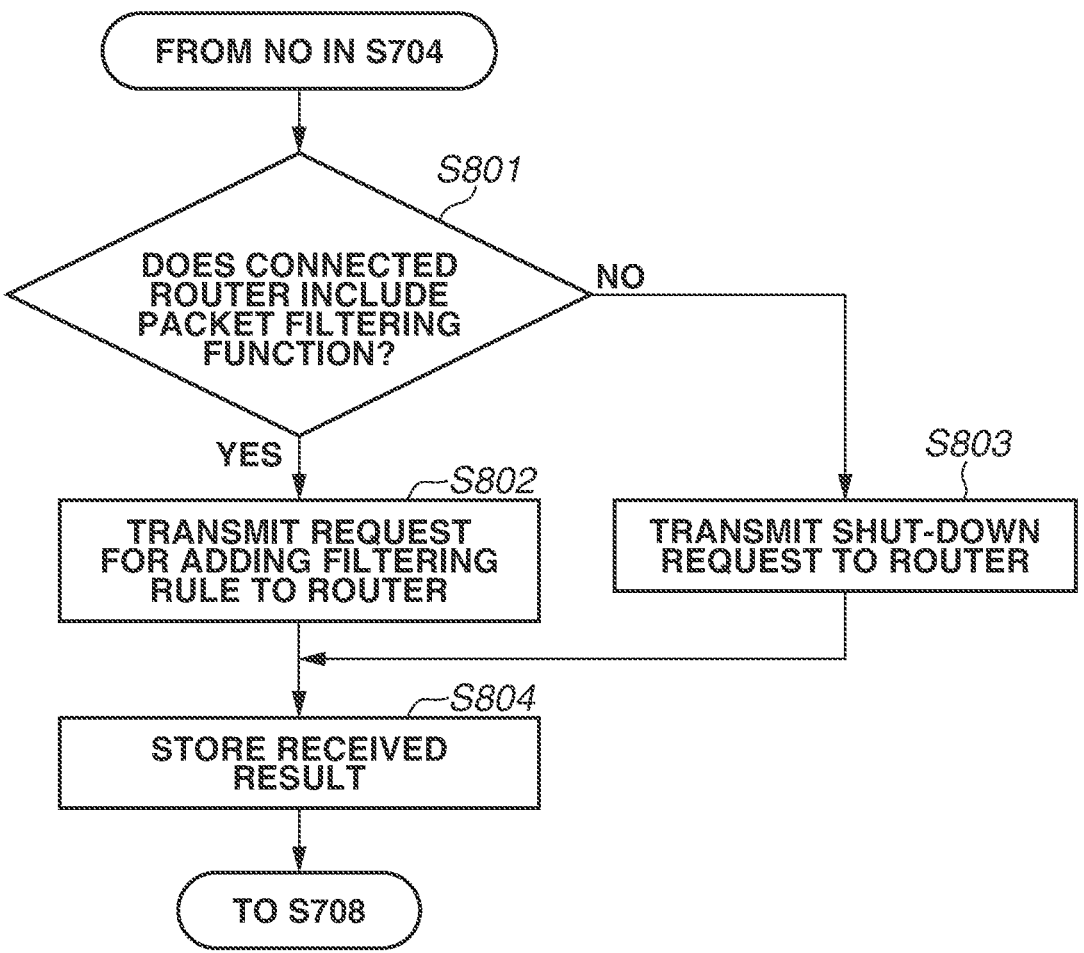
FIG. 8 is a flowchart illustrating an example of control processing to be executed by the MFP.

Next, a specific control operation to be performed by the MFP 101 will be described with reference to flowcharts illustrated in FIGS. 7 and 8. FIGS. 7 and 8 are flowcharts each illustrating an example of a network monitoring control operation to be performed by the information processing apparatus. Each operation illustrated in the flowchart of FIG. 7 is implemented such that programs for implementing the modules illustrated in FIG. 4 are loaded into the RAM 203 and the programs are executed by the CPU 201. To clarify the subject of processing, the processing is described using each module as the subject, as needed. The flowchart illustrated in FIG. 7 is a flowchart including only processing related to a series of monitoring control operations when the MFP 101 operates in a normal state after the communication system is constructed.

For convenience of explanation, it is assumed that the communication system illustrated in FIG. 1 is changed to the network configuration illustrated in the schematic diagram of FIG. 6. It is also assumed that the devices that constitute the communication system participate, or are to participate, on the LAN 120 using network addresses illustrated in Table 1.

TABLE 1

|  | MAC Address | IP Address |
|---|---|---|
| MFP 101 | 00-00-5E-00-53-CA | 192.0.2.101/24 |
| Router 121 | 00-00-5E-00-53-D0 | 192.0.2.100/24 |
| Client Computer 601 | 00-00-5E-00-53-C1 | 192.0.2.102/24 |

In S701, the CPU 201 determines whether a network packet is received in cooperation with the network I/F 208. If a network packet is received (YES in S701), the processing proceeds to S702. If no network packet is received (NO in S701), the processing proceeds to S711. In S711, the CPU 201 determines whether a power-off instruction is received. If the power-off instruction is received (YES in S711), the shut-down processing (not illustrated) is executed and the series of monitoring control operations is terminated. On the other hand, if the power-off instruction is not received (NO in S711), the processing returns to S701 to execute processing for waiting for reception of a further network packet.

In S702, the CPU 201 determines whether the received network packet is a network packet received via the network IN 208. If it is determined that the received network packet is a network packet received via the network IN 208 (YES in S702), the processing proceeds to S703. If it is determined that the received network packet is a network packet received via a network IN different from the network I/F 208 (NO in S702), the processing proceeds to S705.

In S705, the CPU 201 executes processing corresponding to the received network packet. For example, if the received network packet is a packet for transmitting print data, print data is received based on the packet and subsequent packets. Then, the CPU 201 executes processing for printing an image on a sheet based on the received print data. For example, if the received network packet is a search packet for searching for the MFP 101, the MFP 101 transmits a response to the search to an external apparatus that has transmitted the request. If the received network packet is a scanning request packet, the CPU 201 scans a document placed on the platen glass (not illustrated) and generates image data in cooperation with the scanner 230. Then, the CPU 201 generates a file (e.g., portable document format (PDF) file or Joint Photographic Experts Group (JPEG) file) including the generated image data, and transmits the file to an external apparatus that has transmitted the request. After the processing of S705 is completed, the processing proceeds to S701 and the CPU 201 waits for reception of a further packet.

In S703, the communication monitoring unit 410 analyzes the received packet, and acquires information indicating a source MAC address. Next, in S704, the communication monitoring unit 410 determines whether the source MAC address acquired in S703 matches the MAC address of the router 121 managed by the router information management unit 421. If it is determined that the source MAC address matches the MAC address of the router 121 managed by the router information management unit 421 (YES in S704), the processing proceeds to S705. If it determined that the source MAC address does not match the MAC address of the router 121 managed by the router information management unit 421 (NO in S704), the processing proceeds to S707.

The determination in S704 is described in more detail. If a new network device whose MAC address is different from the MAC address of the router 121 is connected to the LAN provided by the router 121, address resolution protocol (ARP) packets and other various packets are broadcasted to the LAN in the same segment. The MFP 101 listens to the packets to monitor if the packets include packets from a device other than the router 121, thereby making it possible to detect participation of a new network device. Accordingly, for example, if the MFP 101 receives a packet in which "00-00-5E-00-53 C1" corresponding to the client computer 601 is set as the source MAC address, the control processing of S707 to S710 is executed. In other words, the processing of S704 is processing for determining whether a new device has participated on the LAN 120.

The present exemplary embodiment illustrates an example where the communication monitoring unit 410 acquires raw data including header information about the received packet using a raw socket and analyzes the raw data. However, the present exemplary embodiment is not limited to this example. For example, the MFP 101 can be provided with a firewall module as typified by iptables, and the communication monitoring unit 410 and the firewall module can be configured to monitor data communication in cooperation. In this case, as a setting for the firewall module, the CPU 201 sets a rule for outputting a log when the received packet that matches a condition indicating that the network I/F 208 is used as a reception I/F and the source MAC address is different from that of the router 121 is detected. The log is recorded when a new network device participates on the LAN 120 based on the setting. In this case, the communication monitoring unit 410 performs processing for periodically checking whether a log of a terminal whose MAC address is different from the MAC address of the router 121 is recorded, instead of performing monitoring processing in real time as described in S701 to S704. As a result of checking processing, if it is determined that the log of the terminal whose MAC address is different from the MAC address of the router 121 is recorded, the processing of S707 to S710 is carried out.

Referring again to FIG. 7, in S707, the communication monitoring unit 410 requests the router association unit 420 to change settings for the router 121. The router association unit 420 that has received the request sends a setting change request to the router 121 in cooperation with the router information management unit 421, the router setting processing unit 422, and the network I/F 208.

Next, router request processing to be executed by the router association unit 420 will be described with reference to FIG. 8. In S801, the router association unit 420 acquires information about the router 121 from the router information management unit 421, and determines whether the connected router 121 includes the packet filtering function based on the information. If it is determined that the router 121 includes the packet filtering function (YES in S801), the router association unit 420 sends a filtering rule setting request to the router setting processing unit 422, and the processing proceeds to S802.

If it is determined that the router 121 does not include packet filtering function (NO in S801), the router association unit 420 sends a router shut-down request to the router setting processing unit 422, and the processing proceeds to S803.

In S802, the router setting processing unit 422 transmits a request for adding a filter rule for a MAC filter illustrated in Table 2 to the router 121.

TABLE 2

| Default Policy | Deny |
| --- | --- |
| Exceptional Address (Allow) | 00-00-5E-00-53-CA |

The setting service 510 of the router 121 that has received the request stores the setting in the setting DB 511. Further, the setting service 510 of the router 121 changes the default policy of the packet filtering unit 501 to a "deny" setting, and sets the MAC address of the MFP 101 in a list of exceptional addresses in the "deny" setting. The setting for the setting service 510 is made using, for example, an iptables command. The packet filtering unit 501 of the router 121 controls the communication on the LAN 120 based on the setting to discard packets received from the LAN 120 or relay packets to the mobile communication network 130. As a result of the setting change request, a newly connected unintended network device is prevented from establishing communication via the router 121.

Referring again to FIG. 8, in S803, the router setting processing unit 422 transmits a remote shut-down request to the router 121. The router 121 that has received the shut-down request executes shut-down processing and shifts to the power-off state. As a result of the shut-down request, the operation of the router 121 itself is stopped if a newly connected unintended network device is connected, thereby making it possible to prevent all communications via the router 121.

In S804, the router setting processing unit 422 receives the result for the request from the router 121, and notifies the router association unit 420 of the received result. The router association unit 420 stores the result in the router information management unit 421, and sends a notification indicating the result to the communication monitoring unit 410 that has sent the request. After the result storage processing and notification processing are completed, the processing proceeds to S708 in FIG. 7.

Referring again to FIG. 7, in S708, the communication monitoring unit 410 displays, on the operation unit 210, a warning message depending on the result in cooperation with the UI control unit 430 and the operation unit 210. The warning message will be described in detail below.

In S709, the setting service 510 requests the log management service 402 to generate a log indicating that there is a possibility that the router 121 may be used for an unintended purpose and indicating a result of taking measures for the unintended use. The log management service 402 that has received the generation request generates a security log and records the generated security log on the storage 204.

In S710, the apparatus management service 403 detects writing of the log, and transmits the log information to the apparatus management server 132 or STEM service. A timing when the security log is transmitted to the apparatus management server 132 is not limited to this timing. For example, the security log may be transmitted at the timing when apparatus information is periodically transmitted. If the router 121 is shut down in S803, information indicating that there is a possibility of an unintended use and the router 121 is to be shut down may be transmitted before the processing of S803 is executed.

A purpose of the SIEM service is to detect a security incident in real time. Accordingly, in the present exemplary embodiment, the security log is transmitted to the SIEM service in S710.

Lastly, the warning message will be described with reference to FIGS. 9A to 9C. FIGS. 9A to 9C each illustrate an example of the warning message to be displayed on the operation unit 210.

A message 800 illustrated in FIG. 9A is an example of a message to be displayed when the request processing result indicates that the addition of the filtering rule to the router 121 is successful. By checking the message, the user such as an administrator can understand that an event that may lead to a security incident has occurred. Further, the user that has established an unintended connection as described above with reference to FIG. 6 is caused to check the operation unit 210, thereby enabling the user to understand that the router 121 cannot be used by a device other than the MFP 101.

A message 801 illustrated in FIG. 9B is an example of a message to be displayed when the request processing result indicates that the shut-down request is made. By checking the message, the user such as the administrator can understand that an event that may cause a security incident has occurred. Further, the message 801 can be used to notify the user that the operation state has transitioned to a state where communication via the router 121 is not available.

A message 802 illustrated in FIG. 9C is an example of a message to be displayed when the request processing result indicates a failure, no response, or the like. By checking the message, the user such as the administrator can understand that an event that may cause a security incident has occurred. Further, the message 802 can be used to notify the user that the settings need to be changed.

The contents of the warning message are not limited to these examples. For example, the contents of the message may be displayed in a simplified form using, for example, an error code or a notification indicating that a network error has occurred.

As described above, according to the present exemplary embodiment, the communication system connected to the mobile communication network 130 can prevent an unintended network device from using the mobile communication network 130.

Further, in the exemplary embodiment described above, the processing for preventing an unintended network device from using the mobile communication network 130 is performed at a timing when the connection configuration illustrated in FIG. 6 is changed. This saves time and labor for a maintenance engineer to statically perform a packet filtering setting for the router 121 as an initial setting.

In some cases, an event in which the MAC address of the network I/F connected to the LAN 120 is changed may occur. Examples of the event include a substrate replacement for maintenance of the MFP 101, and change of an interface used for connection. On the other hand, when the router 121 is restarted, the filtering rule described above with reference to FIG. 8 is cancelled and is reset to the default filtering rule based on a setting configuration file. Accordingly, even if the MAC address used for the MFP 101 to connect to the LAN 120 is changed, the advantageous effect of reconstructing the communication system only by restarting the router 121 without changing the settings on the router 121 can be obtained.

According to one aspect of the present disclosure, it is possible to prevent an unintended network device from using a mobile communication network of a router upon detection of a connection of an information processing apparatus different from the router.

MODIFIED EXAMPLES

In addition to the processing of S704, processing for determining whether the source MAC address in the packet received from the IN 208 matches the MAC address of the MFP 101 may be added. In the case of adding this processing, if it is determined that the source MAC address in the packet received from the I/F 208 matches the MAC address of the MFP 101, the MFP 101 may be controlled to transmit the shut-down request described in S803. By adding this processing, for example, even in a case where a network device that disguises the device with the source MAC address "00-00-5E-00-53-CA" is newly connected, it is possible to appropriately prevent the newly connected device from using the mobile communication network.

Further, in the apparatus management server 132 or SIEM service that has received the log information transmitted in S710, a possibility of an unintended use can be detected and line interruption processing for the router 121 can also be performed. The server 132 or SIEM service that has received the log information transmits, to the server for mobile communication services, a request for interrupting the communication using the SIM card attached to the router 121 or the eSIM incorporated in the router 121. The request includes subscriber identification information for uniquely identifying the SIM card or eSIM. The server that has received the request updates authentication information held in a base station of the mobile communication network or a back-end server connected to the base station so as to prevent connection to the mobile communication network with the SIM card or eSIM. In this case, the apparatus management server 132 may further transmit the above-described stop (interrupt) request in a case where a predetermined period has elapsed after a periodic communication of apparatus information from the MFP 101 is interrupted. This control processing makes it possible to prevent an unintended use, for example, even when the router 121 is removed.

While the present exemplary embodiment illustrates an example where the default policy indicates "deny" and the filtering rule for setting the MAC address of the MFP 101 is added as an exception rule in the "deny" setting, a rule illustrated in Table 3 may be added in a modified example.

TABLE 3

| Default Policy | Allow |
| --- | --- |
| Exceptional Address (Deny) | 00-00-5E-00-53-C1 |

The rule illustrated in Table 3 indicates that the default policy indicates "allow" and the MAC address of the client computer 601 that is a newly connected network device is set as an exception rule in the "allow" setting. A similar advantageous effect can also be obtained by adding this rule. The above-described exemplary embodiment illustrates an example where access restriction is performed using a MAC address as an example of identification information for identifying a network device. However, the present invention is not limited to this example. For example, an IP address may be used as identification information for identifying a network device. In this case, the same type of rules may be added using an IP address filter.

Further, for the purpose of, for example, initial installation or trouble shooting in a case where a communication trouble or the like occurs, the prevention function may be temporarily turned off by an operation performed by a maintenance user. Further, for example, a function for initializing the filtering setting for the router 121 through an operation by the maintenance user may be provided. In this case, the MFP 101 may be configured to display an operation screen for turning off or initializing the prevention function only when a special operation disclosed only to the maintenance user is received.

Further, an instant adhesive or the like for bonding a connector end and an acceptor and preventing the connector end from being detached from the acceptor may be packaged as an accessory for the MFP 101 so as to reduce the possibility of attaching a device including a hub function such as the switch 600. The MFP 101 displays a setting screen for supporting the construction of the communication system including the router 121 and the MFP 101. The service engineer or installation worker changes the setting for the IP address for communication with the router 121 and other operation settings for the MFP 101 via the setting screen. The MFP 101 attempts to connect to the Internet 131 based on settings made by the service engineer or installation worker. Further, when the connection to the Internet 131 is successful, the MFP 101 displays a screen for prompting the user to bond one end of the cable to the router 121 and to bond the other end of the cable to the MFP 101. The screen may include a message for prompting the user to fix the router 121 itself to the MFP 101.

In the case of constructing the communication system including the MFP 101 and the router 121, the service engineer or installation worker can perform processing for preventing detachment or removal of the router 121 using an instant adhesive as the accessory. Further, since a message for prompting the user to perform the bonding process is displayed when the connection to the Internet 131 is successful, the user can be prevented from forgetting to perform the bonding process. This processing makes it possible to set a high psychological hurdle and a high physical hurdle for the user that intends to establish data communication for an unintended purpose and to further reduce the possibility of establishing data communication for an unintended purpose.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-060817, which was filed on Mar. 31, 2021 and which is hereby incorporated by reference herein in its entirety.

What is claimed is:

1. A communication system comprising:

a relay apparatus configured to connect to a mobile communication network;

an information processing apparatus configured to connect to the relay apparatus via a local area network; and an apparatus management server configured to manage the information processing apparatus, wherein the information processing apparatus is configured to, upon detecting a connection of an external apparatus different from the relay apparatus on the local area network, transmit a first request to the relay apparatus and first information to the apparatus management server, wherein the first request is a request for changing an operation setting of the relay apparatus and the first information indicates that the external apparatus is connected to the apparatus management server, wherein the relay apparatus is configured to restrict communication of the external apparatus via the mobile communication network based on receiving the first request transmitted by the information processing apparatus, wherein the apparatus management server is configured to transmit, based on the apparatus management server receiving the first information, second information for identifying a subscriber and a second request for interrupting use of the mobile communication network to a server of a carrier providing a mobile communication service via the mobile communication network to which the relay apparatus is connected, and wherein, based on the information processing apparatus detecting the connection of the external apparatus on the local area network, both of the transmitting the first request by the information processing apparatus and the transmitting the second request by the apparatus management server are performed.

2. The communication system according to claim 1, wherein the first request is a request for allowing exchange of identification information about the information processing apparatus and a packet for an information processing apparatus identified by the identification information, and for setting a packet filtering condition to the relay apparatus, the packet filtering condition being a condition of denying exchange of a packet with the external apparatus different from the relay apparatus via the relay apparatus.

3. The communication system according to claim 2, wherein the identification information is one of a media access control (MAC) address and an internet protocol (IP) address of the information processing apparatus.

4. The communication system according to claim 1, wherein the first request is a request for shutting down the relay apparatus, and the relay apparatus restricts communication via the mobile communication network by shut-down processing upon reception of the request.

5. The communication system according to claim 1, wherein the information processing apparatus is a printing apparatus configured to print an image on a sheet.

6. The communication system according to claim 1, wherein the information processing apparatus and the relay apparatus are connected with a wired cable.

7. The communication system according to claim 6, wherein the information processing apparatus is configured to display, on a display unit of the information processing apparatus, a screen for prompting a user to bond one end of the wired cable to the information processing apparatus and to bond another end of the wired cable to the relay apparatus, after completion of construction of a local area network including the information processing apparatus and the relay apparatus.

8. The communication system according to claim 1, wherein the information processing apparatus is configured to display a notification content that indicates a result of transmitting the first request on a display of the information processing apparatus.

9. The communication system according to claim 8, wherein the notification content is displayed when setting a packet filtering condition in the relay apparatus is successful on a basis of the first request.

10. The communication system according to claim 8, wherein the notification content indicates that the relay apparatus is shut down on a basis of the first request.

11. The communication system according to claim 8, wherein the notification content is displayed when processing on the relay apparatus based on the first request fails, and raises an alert regarding a configuration of the local area network.

* * * * *